US008888620B2

(12) United States Patent  (10) Patent No.: US 8,888,620 B2
Emura et al.  (45) Date of Patent: Nov. 18, 2014

(54) FRONT DERAILLEUR

(71) Applicants: Atsuhiro Emura, Osaka (JP); Kazuya Kuwayama, Osaka (JP); Kenkichi Inoue, Osaka (JP)

(72) Inventors: Atsuhiro Emura, Osaka (JP); Kazuya Kuwayama, Osaka (JP); Kenkichi Inoue, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 13/705,364

(22) Filed: Dec. 5, 2012

(65) Prior Publication Data

US 2014/0155204 A1 Jun. 5, 2014

(51) Int. Cl.
| F16H 9/00 | (2006.01) |
| F16H 59/00 | (2006.01) |
| F16H 61/00 | (2006.01) |
| F16H 63/00 | (2006.01) |
| B62M 9/135 | (2010.01) |

(52) U.S. Cl.
CPC .................................. B62M 9/135 (2013.01)
USPC ............................................. 474/80; 474/82

(58) Field of Classification Search
CPC ...... B62M 9/132; B62M 9/135; B62M 9/136; B62M 9/137; B62M 25/08
USPC ..................................................... 474/80, 82
See application file for complete search history.

(56) References Cited

U.S. PATENT DOCUMENTS

| 4,199,997 A * | 4/1980 | Isobe ............................ 474/82 |
| 4,199,998 A * | 4/1980 | Isobe ............................ 474/82 |
| 4,675,952 A * | 6/1987 | Nagano ........................ 24/483 |
| 6,162,140 A * | 12/2000 | Fukuda ......................... 474/70 |
| 6,270,124 B1 * | 8/2001 | Nanko ........................... 285/15 |
| 6,843,741 B2 * | 1/2005 | Fujii .............................. 474/70 |
| 6,945,888 B2 * | 9/2005 | Fukuda et al. ................. 474/70 |
| 6,979,009 B2 * | 12/2005 | Ichida et al. ................ 280/238 |
| 7,291,079 B2 * | 11/2007 | Ichida et al. ................... 474/80 |
| 7,306,531 B2 * | 12/2007 | Ichida et al. ................... 474/70 |
| 7,331,890 B2 * | 2/2008 | Ichida et al. ................... 474/80 |
| 7,341,532 B2 * | 3/2008 | Ichida et al. ................... 474/70 |
| 7,442,136 B2 * | 10/2008 | Ichida et al. ................... 474/82 |
| 7,704,172 B2 * | 4/2010 | Tetsuka et al. ................. 474/80 |
| 7,704,173 B2 * | 4/2010 | Ichida et al. ................... 474/82 |
| 7,722,487 B2 * | 5/2010 | Ichida et al. ................... 474/80 |
| 7,789,351 B2 * | 9/2010 | Auer .......................... 248/74.3 |
| 7,922,612 B2 * | 4/2011 | Yoshida et al. ................ 474/80 |
| 8,241,158 B2 * | 8/2012 | Ishikawa ....................... 474/80 |
| 8,574,105 B2 * | 11/2013 | Auer ............................. 474/82 |
| 2004/0185975 A1 * | 9/2004 | Chen ............................. 474/80 |
| 2005/0192139 A1 * | 9/2005 | Ichida et al. ................... 474/80 |
| 2005/0197222 A1 * | 9/2005 | Tatsumi ......................... 474/80 |
| 2005/0204846 A1 * | 9/2005 | Valle et al. .................... 74/469 |
| 2005/0205323 A1 * | 9/2005 | Ichida et al. ................. 180/205 |
| 2006/0189421 A1 * | 8/2006 | Ichida et al. ................... 474/80 |
| 2007/0037645 A1 * | 2/2007 | Ishikawa ....................... 474/80 |
| 2007/0117666 A1 * | 5/2007 | Ichida et al. ................... 474/80 |
| 2007/0184925 A1 * | 8/2007 | Ichida et al. ................... 474/80 |
| 2008/0132364 A1 * | 6/2008 | Ichida et al. ................... 474/70 |
| 2012/0295745 A1 * | 11/2012 | Emura et al. .................. 474/80 |

* cited by examiner

Primary Examiner — Henry Liu
(74) Attorney, Agent, or Firm — Global IP Counselors

(57) ABSTRACT

A front derailleur unit basically includes a fixed member and a movable member. The fixed member is configured to be releasably attached to a plurality of different type mounting units. The different type mounting units is detachably attached to a bicycle frame. The movable member is movably supported to the fixed member to move with respect to the fixed member.

28 Claims, 16 Drawing Sheets

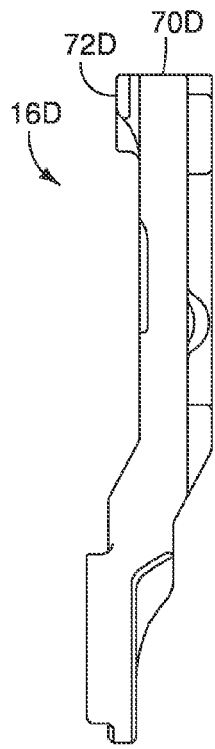
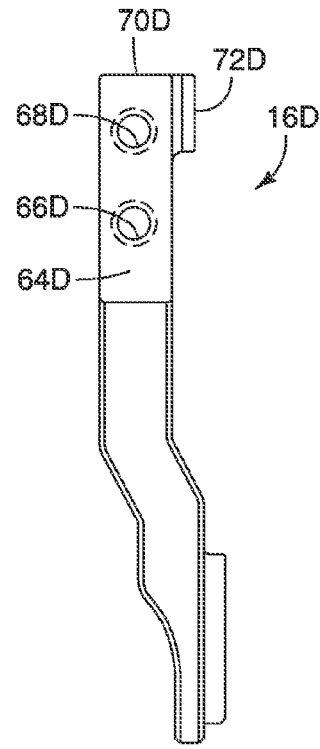
FIG. 25  FIG. 26
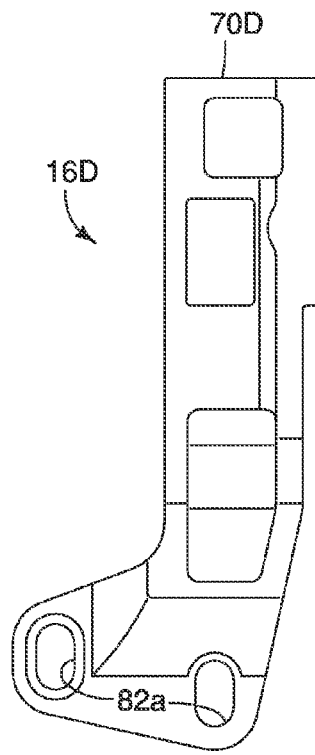
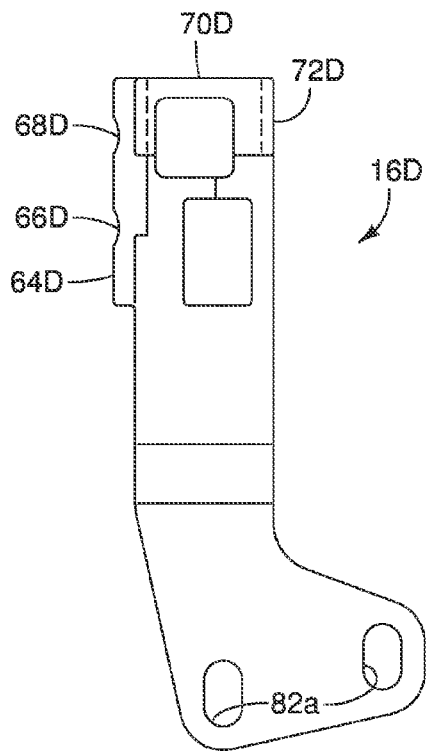
FIG. 27  FIG. 28

FRONT DERAILLEUR

BACKGROUND

1. Field of the Invention

This invention generally relates to a front derailleur. More specifically, the present invention relates to a front derailleur having configuration that can be mounted to various bicycle frames.

2. Background Information

Generally, a front derailleur is mounted to the bicycle frame adjacent to the front chain rings to shift a chain laterally between the front chain rings. A front derailleur includes a fixed or base member that is non-movably secured to the bicycle frame. A front derailleur further includes a movable member or chain guide that is movably supported relative to the fixed member such that the chain guide moves between at least two lateral shift positions to shift the chain between the front chain rings. Typically, a linkage assembly is coupled between the fixed member and the chain guide in order to movably support the chain guide. The chain guide typically has a pair of cage plates or guide plates arranged to selectively contact and move the chain between the front chain rings. The cage plates or guide plates form lateral sides of a chain cage portion of the chain guide.

Depending on the bicycle frame configuration, the front derailleur is sometimes mounted on the seat tube, while other times the front derailleur is mounted on the bottom bracket. Moreover, the manner in which front derailleur is mounted on the seat tube can also vary depending on the bicycle frame configuration. Accordingly, front derailleurs are usually configured with a particular type of mounting structure that can only be mounted on bicycle frames in one particular manner.

SUMMARY

Generally, the present disclosure is directed to a front derailleur. In one feature, a front derailleur unit is configured to be releasably attached to a plurality of different type mounting units. In this way, a single front derailleur unit can be mounted on a bicycle frame in different ways.

In view of the state of the known technology, a front derailleur unit is provided that basically comprises a fixed member and a movable member. The fixed member is configured to be releasably attached to a plurality of different type mounting units. The different type mounting units is detachably attached to a bicycle frame. The movable member is movably supported to the fixed member to move with respect to the fixed member.

Other objects, features, aspects and advantages of the disclosed front derailleur unit will become apparent to those skilled in the art from the following detailed description, which, taken in conjunction with the annexed drawings, discloses a preferred embodiment of the front derailleur unit.

BRIEF DESCRIPTION OF THE DRAWINGS

Referring now to the attached drawings which form a part of this original disclosure

FIG. 25 is a front elevational view of the fourth mounting unit of the front derailleur illustrated in FIGS. 22 to 24;

FIG. 26 is a rear elevational view of the fourth mounting unit of the front derailleur illustrated in FIGS. 22 to 24;

FIG. 27 is a first side elevational view of the fourth mounting unit of the front derailleur illustrated in FIGS. 22 to 24;

FIG. 28 is a second side elevational view of the fourth mounting unit of the front derailleur illustrated in FIGS. 22 to 24 as viewed from the opposite side from FIG. 27;

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
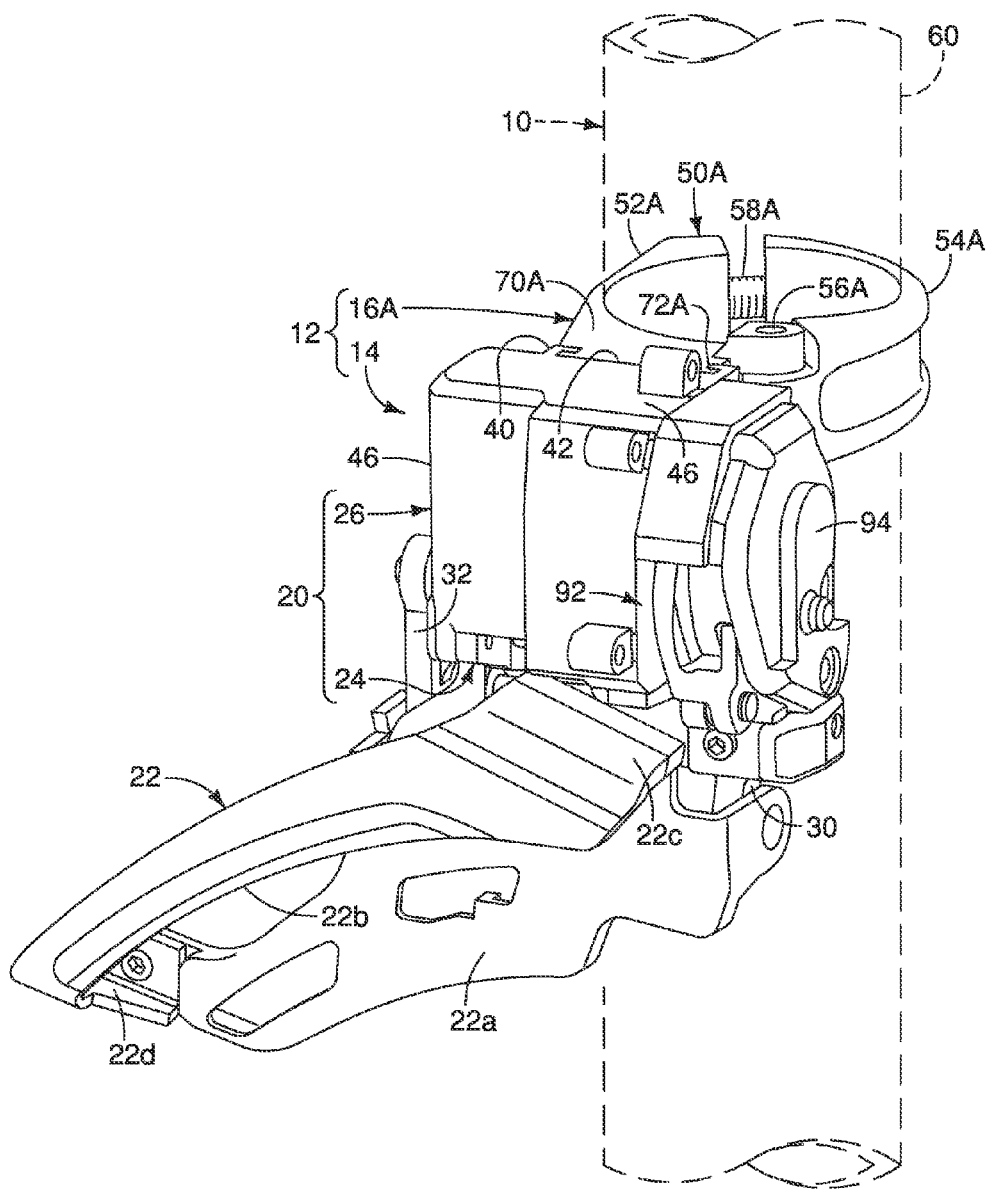
FIG. 1 is a partial side perspective view of a bicycle frame having a front derailleur unit of a front derailleur mounted to the frame by a first mounting unit of the front derailleur in accordance with one embodiment.
Figure 2:
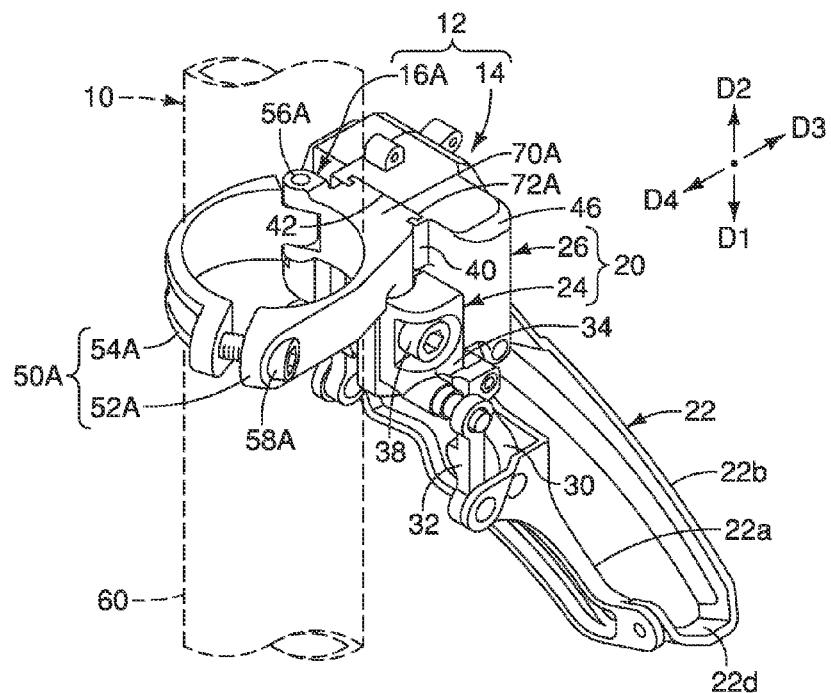
FIG. 2 is a perspective view of the bicycle frame and the front derailleur with the first mounting unit illustrated in FIG. 1 as viewed from the opposite side.
Figure 3:
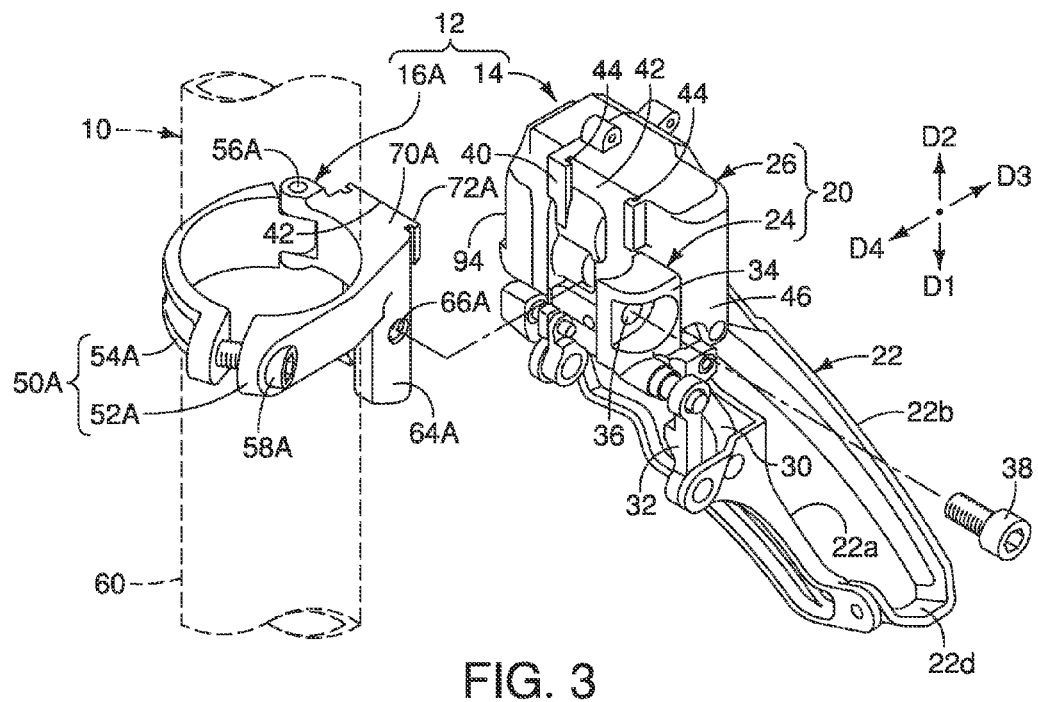
FIG. 3 is a perspective view of the bicycle frame and the front derailleur illustrated in FIGS. 1 and 2 with the front derailleur unit detached from the first mounting unit.
Figure 4:
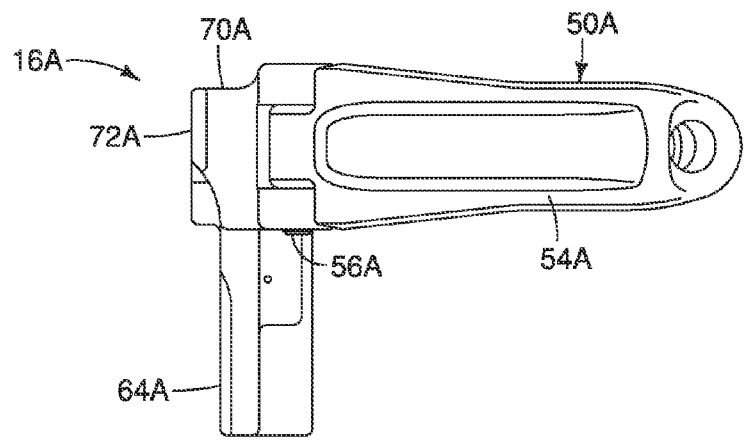
FIG. 4 is a front elevational view of the first mounting unit of the front derailleur illustrated in FIGS. 1 to 3.
Figure 5:
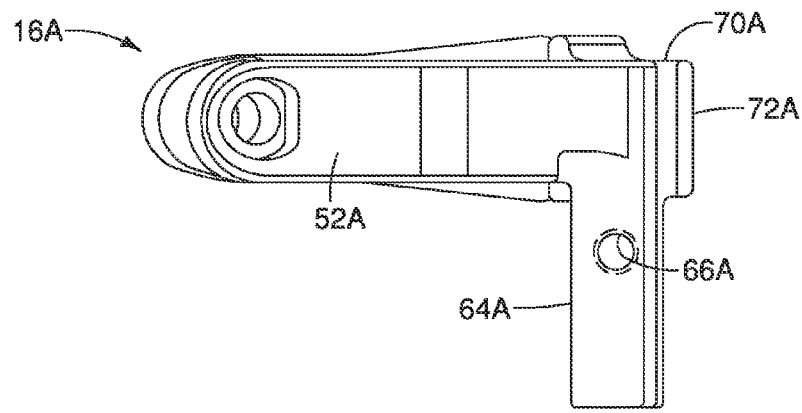
FIG. 5 is a rear elevational view of the first mounting unit of the front derailleur illustrated in FIGS. 1 to 3.
Figure 6:
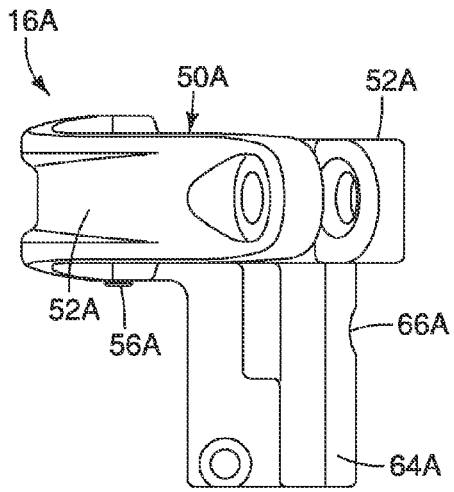
FIG. 6 is a first side elevational view of the first mounting unit of the front derailleur illustrated in FIGS. 1 to 3.
Figure 7:
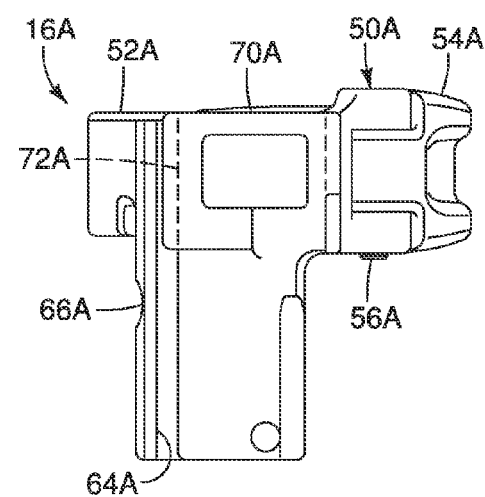
FIG. 7 is a second side elevational view of the first mounting unit of the front derailleur illustrated in FIGS. 1 to 3 as viewed from the opposite side from FIG. 6.

Referring initially to FIGS. 1 to 3, a portion of a bicycle frame 10 is illustrated with a front derailleur 12 in accordance with one embodiment. The front derailleur 12 basically includes a front derailleur unit 14 and a mounting unit such as a first mounting unit 16A as seen in FIGS. 1 to 7. Here, in the illustrated embodiment, the front derailleur 12 is an electric front derailleur, which is designed to be used with a bicycle that has three front chain rings or sprockets. However, it will be apparent to those skilled in the art from this disclosure that the invention can be applied to a cable operated derailleur. As seen in FIGS. 1 and 2, the front derailleur 12 is illustrated in an installed position.

Figure 8:
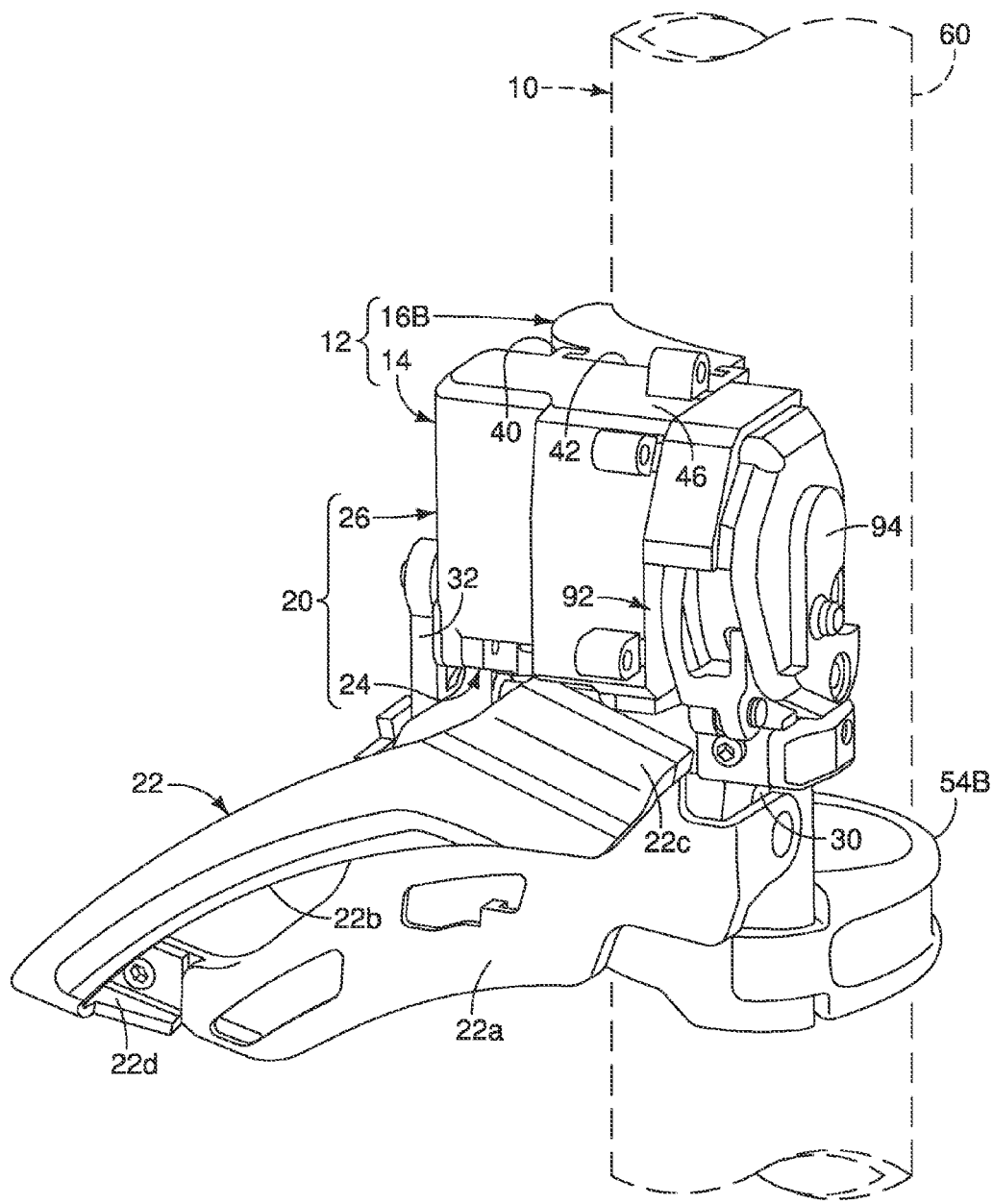
FIG. 8 is a partial side perspective view of the bicycle frame and the front derailleur unit mounted to the frame by a second mounting unit.
Figure 9:
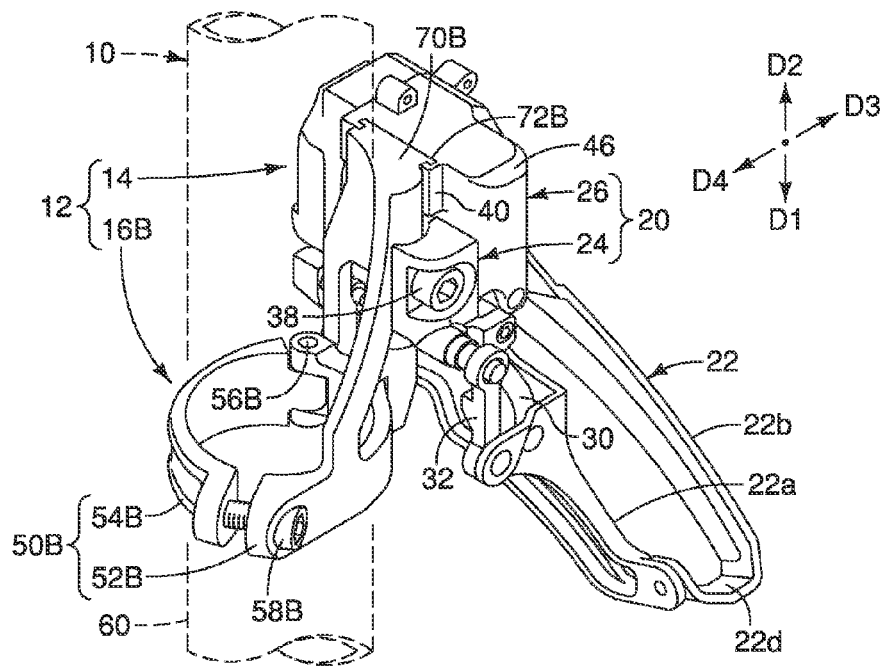
FIG. 9 is a perspective view of the bicycle frame and the front derailleur with the second mounting unit illustrated in FIG. 8 as viewed from the opposite side.
Figure 10:
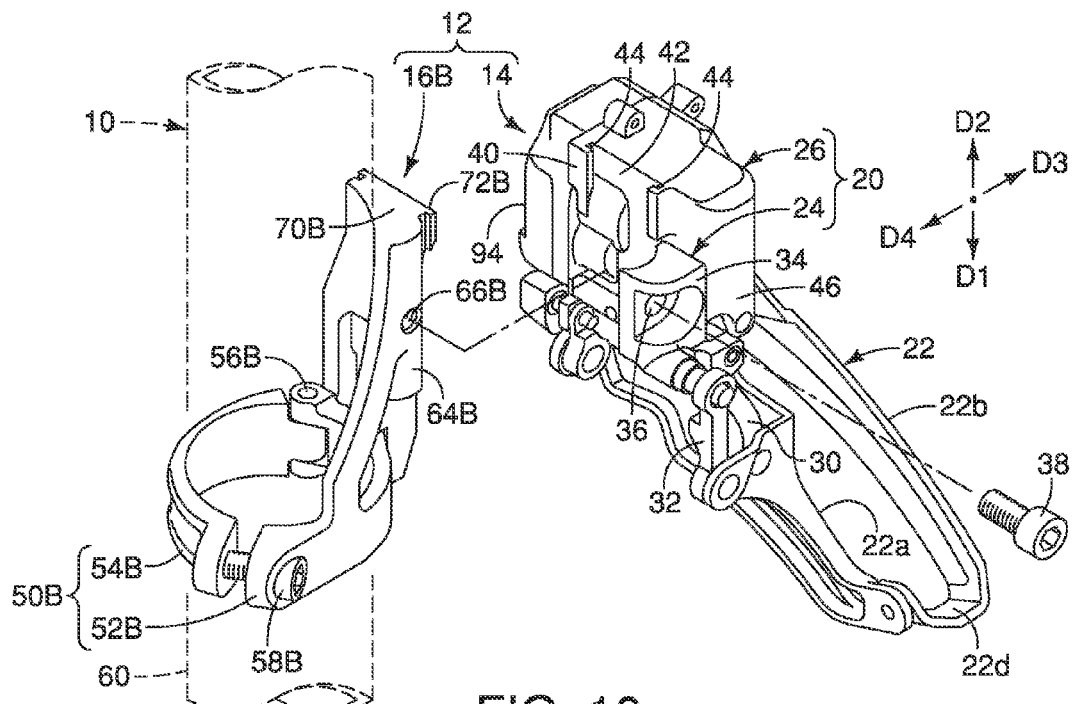
FIG. 10 is a perspective view of the bicycle frame and the front derailleur illustrated in FIGS. 8 and 9 with the front derailleur unit detached from the second mounting unit.
Figure 11:
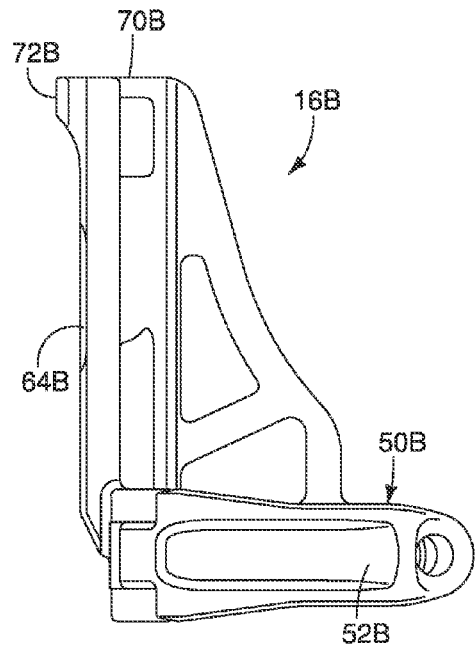
FIG. 11 is a front elevational view of the second mounting unit of the front derailleur illustrated in FIGS. 8 to 10.
Figure 12:
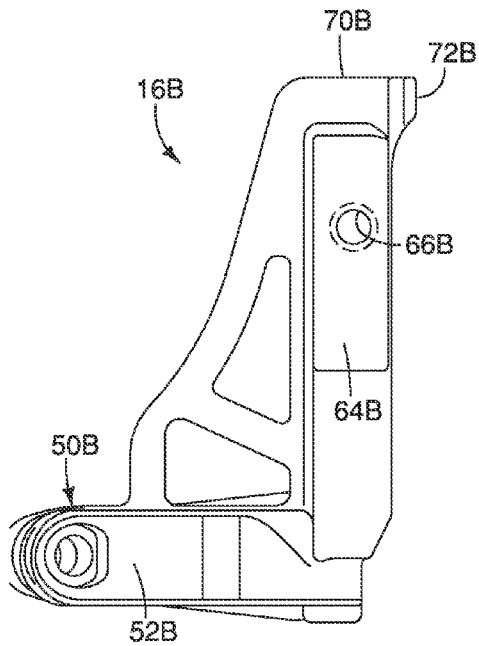
FIG. 12 is a rear elevational view of the second mounting unit of the front derailleur illustrated in FIGS. 8 to 10.
Figure 13:
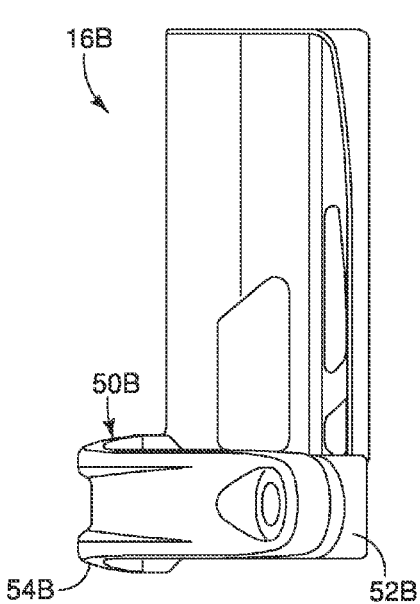
FIG. 13 is a first side elevational view of the second mounting unit of the front derailleur illustrated in FIGS. 8 to 10.
Figure 14:
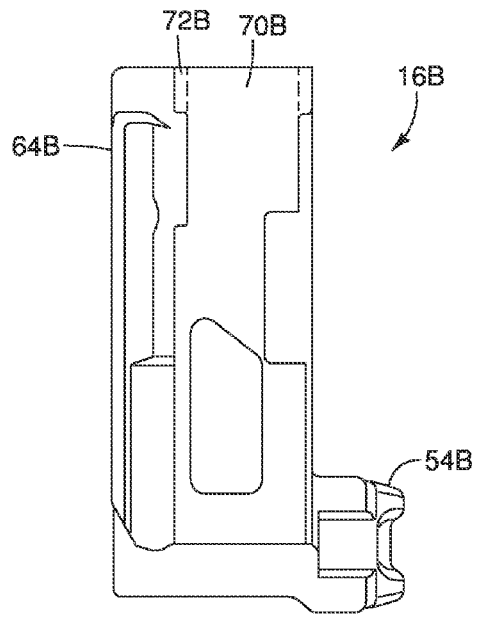
FIG. 14 is a second side elevational view of the second mounting unit of the front derailleur illustrated in FIGS. 8 to 10 as viewed from the opposite side from FIG. 13.
Figure 22:
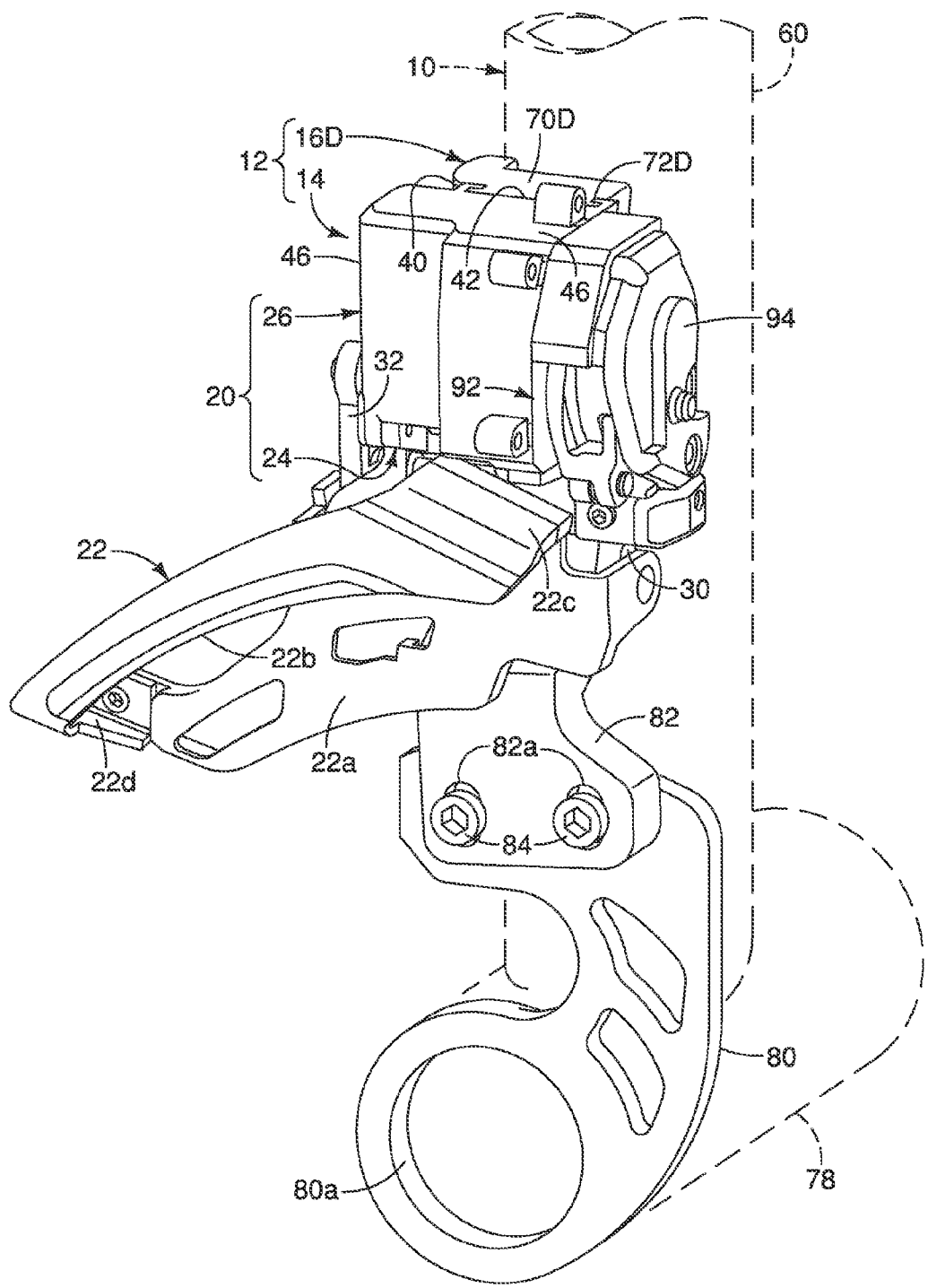
FIG. 22 is a partial side perspective view of the bicycle frame and the front derailleur unit mounted to the frame by a fourth mounting unit.
Figure 23:
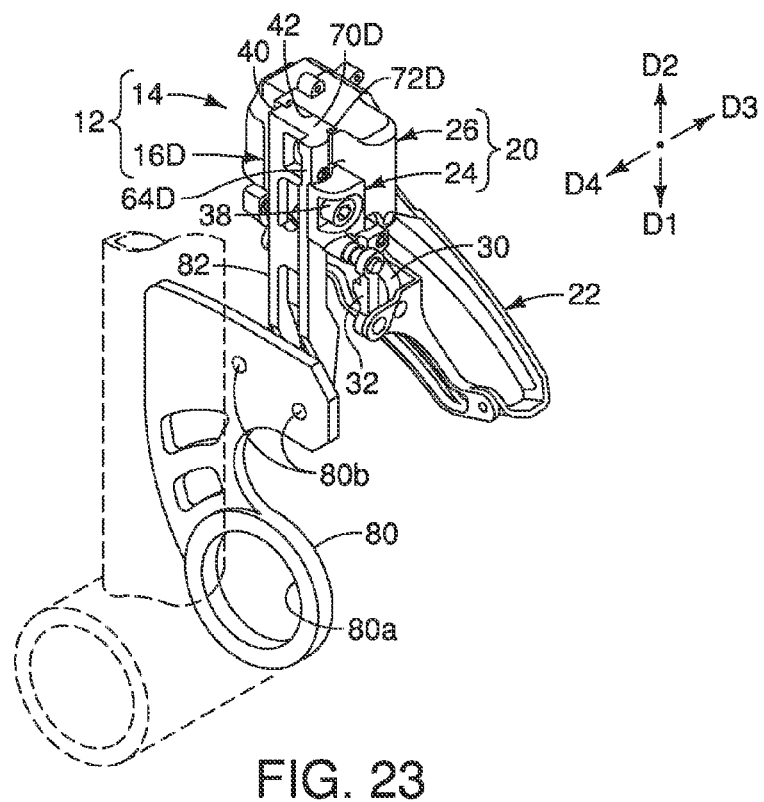
FIG. 23 is a perspective view of the bicycle frame and the front derailleur with the fourth mounting unit illustrated in FIG. 22 as viewed from the opposite side.
Figure 24:
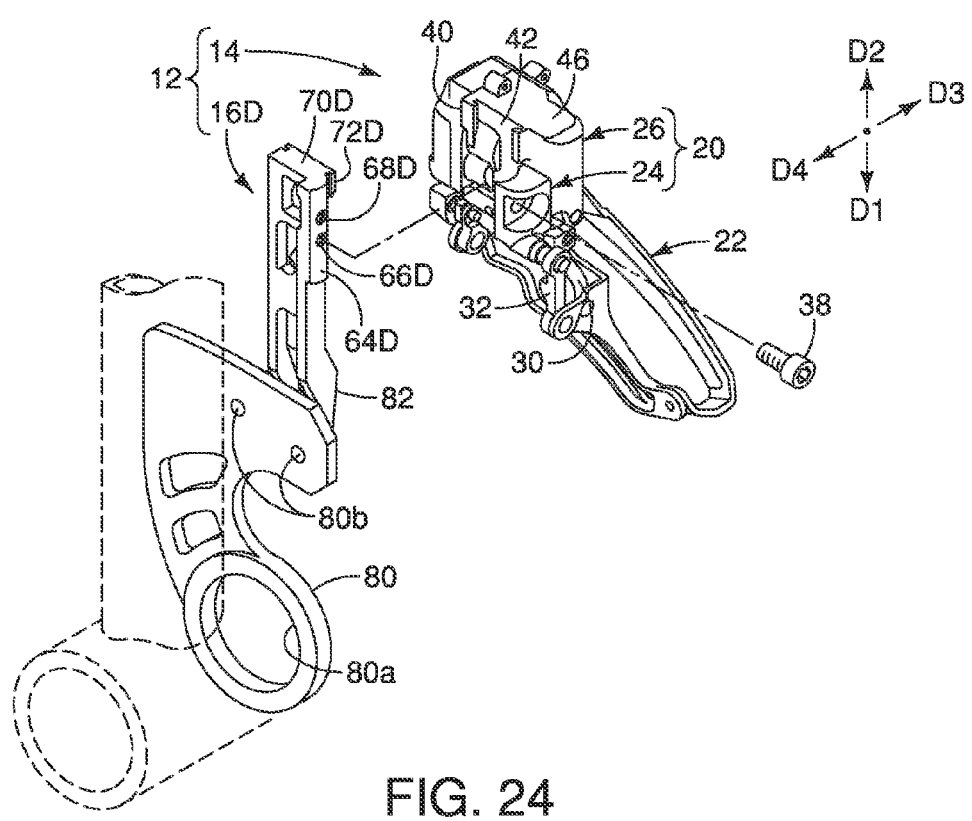
FIG. 24 is a perspective view of the bicycle frame and the front derailleur illustrated in FIGS. 22 and 23 with the front derailleur unit detached from the fourth mounting unit.
Figure 29:
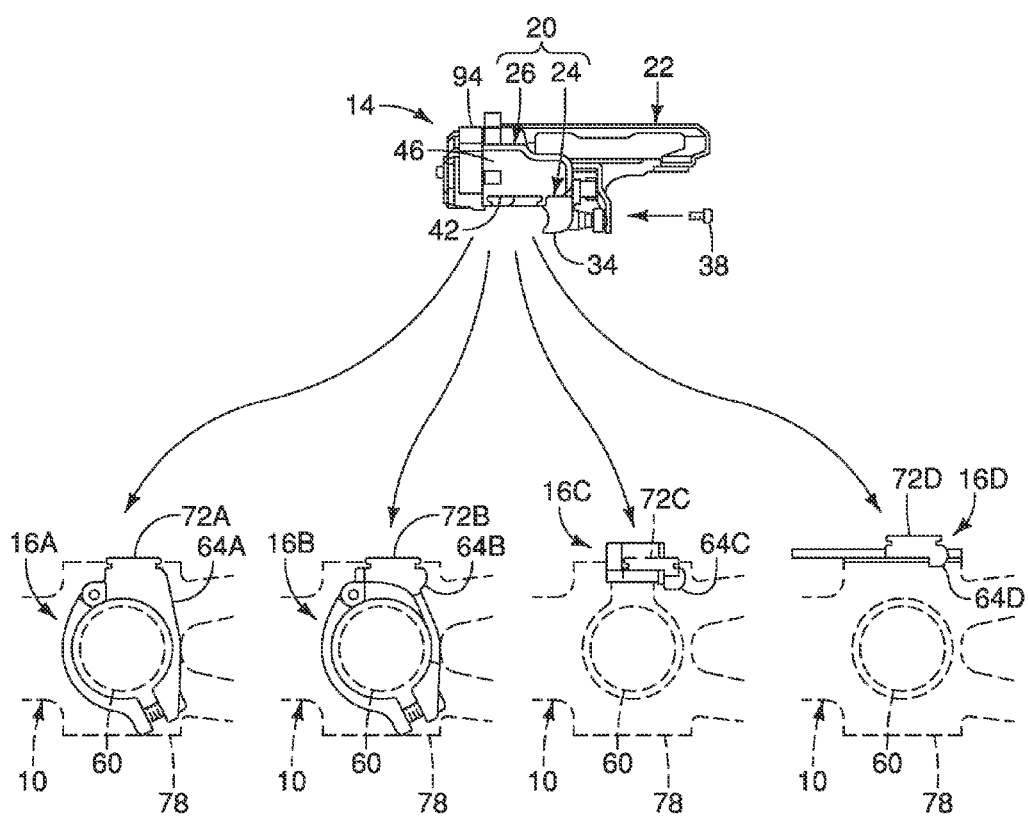
FIG. 29 is a top plan view of the front derailleur unit and the four different mounting units illustrated in FIGS. 1 to 28 which form a front derailleur set.

As explained later, the front derailleur 12 is a part of a front derailleur set (FIG. 29) that, in addition to the front derailleur unit 14 and the first mounting unit 16A (FIG. 1), further includes a plurality of different type mounting units 16B (FIG. 8), 16C (FIG. 15) and 16D (FIG. 22). While four different type mounting units 16A, 16B, 16C and 16D are illustrated, not all of the mounting units are needed to be included in the front derailleur set. Moreover, the different type mounting units are not limited to the ones illustrated herein. In any case, the front derailleur unit 14 is configured to be releasably attached to the mounting units 16A, 16B, 16C and 16D. In this way, a single front derailleur unit 14 can be mounted on a bicycle frame in different ways. As used herein, the front derailleur 12 is formed by the front derailleur unit 14 and one of the mounting units 16A, 16B, 16C and 16D.

As seen in FIGS. 1 to 3, the front derailleur unit 14 basically includes a fixed member 20 and a movable member 22 (e.g., a chain guide). In this illustrated embodiment, the fixed member 20 includes a base member 24 and an electric motor unit 26. The movable member 22 includes an inner plate 22a, an outer plate 22b, a top connecting member 22c and a bottom connecting member 22d. The inner plate 22a and the outer plate 22b are laterally spaced apart and connected to each other at upper portions by the top connecting member 22c and connected to each other at lower portions by the bottom connecting member 22d to define a chain cage portion. The inner plate 22a pushes a chain up onto a larger chain ring during an upshift operation. The outer plate 22b pulls a chain inward onto a smaller chain ring during a downshift operation.

The movable member 22 is movably supported to the base member 24 of the fixed member 20 by an outer link 30 and an inner link 32 to move the chain guide portion 28 with respect to the fixed member 20. The outer and inner links 30 and 32 have first ends pivotally connected to the base member 24 and second ends pivotally mounted to the movable member 22. Thus, the outer and inner links 30 and 32 define a four bar linkage that operatively connects the movable member 22 to the base member 24. The front derailleur unit 14 is designed to be used with a bicycle that has three front chain rings. Thus, the movable member 22 is movable with respect to the base member 24 between a first end position, an intermediate or middle position and a second end position.

As seen in FIGS. 3, 10, 17, 24 and 29, the base member 24 is a rigid member that includes a fixing portion 34 that is fixedly attached one at a time to the mounting units 16A, 16B, 16C and 16D to the fixed member 20 depending on the desired mounting arrangement for the bicycle frame 10. Preferably, the fixing portion 34 has at least one fixing fastener receiving hole 36 that receives a fixing fastener 38 to selectively fix the fixed member 20 to one of the mounting units 16A, 16B, 16C and 16D. Of course, it will be apparent from this disclosure that the fixing portion 34 can have a plurality of fixing fastener receiving holes to selectively receive the fixing fastener 38 if needed and/or desired.

Still referring to FIGS. 3, 10, 17, 24 and 29, the base member 24 of the fixed member 20 further includes an attachment portion 40 to which the different type mounting units 16A, 16B, 16C and 16D are non-fixedly attached one at a time so as to prevent relative movement between the fixed member 20 and the different type mounting units 16A, 16B, 16C and 16D while the fixed member 20 and the different type mounting units 16A, 16B, 16C and 16D are attached to each other. In the illustrated embodiment, the attachment portion 40 includes a track 42 that slidably engages the mounting units 16A, 16B, 16C and 16D. The track 42 has a pair of parallel grooves 44. Here, the attachment portion 40 is formed on a housing 46 of the motor unit 26. Thus, in the illustrated embodiment, the attachment portion 40 is arranged at the motor unit 26, and the fixing portion 34 is arranged at the base member 24.

As mentioned above, the mounting units 16A, 16B, 16C and 16D can be provided with the front derailleur unit 14 as a front derailleur set (FIG. 29) in which the installer can select which of the mounting units 16A, 16B, 16C and 16D is most desirable for a particular bicycle frame. Thus, the front derailleur unit 14 can be packaged and sold with all or some of the mounting units 16A, 16B, 16C and 16D as a front derailleur set. Alternatively, the front derailleur unit 14 can be packaged and sold separately form the mounting units 16A, 16B, 16C and 16D.

Now the first mounting unit 16A will be discussed in more detail with reference to FIGS. 1 to 7. The first mounting unit 16A is configured as a high clamp type mounting unit that is releasably attached to the front derailleur unit 14 by the fixing fastener 38. The first mounting unit 16A includes a first clamp member 50A that is disposed above the movable member 22 with the front derailleur 12 in the installed position. Here, the first clamp member 50A is a hinge type band clamp having a pair of clamping portions 52A and 54A. A hinge pin 56A hingedly connects first ends of the clamping portions 52A and 54A together, while second ends of the clamping portions 52A and 54A are fastened together by a fastener 58A. Here, the fastener 58A includes a bolt and a nut that are used to draw the second ends of the clamping portions 52A and 54A together for clamping onto a seat tube 60 of the bicycle frame 10. The first mounting unit 16A further includes a fixing portion 64A having a threaded hole 66A for receiving the fixing fastener 38. It will be apparent from this disclosure that the fixing portion 64A can be provided with a plurality of threaded holes to selectively receive the fixing fastener 38 if needed and/or desired.

The first mounting unit 16A further includes an attachment portion 70A. In the illustrated embodiment, the fixing portion 64A and the attachment portion 70A are integrally formed together with the clamping portion 52A as a one-piece, unitary member. Here, the attachment portion 70A includes a slider 72A that has two rails. The rails of the slider 72A slidably engage the track 42. Typically, as illustrated herein, the track 42 and the slider 72A are arranged in a generally upright or primarily vertical direction while installed on the bicycle frame 10. While the first mounting unit 16A includes the slider 72A and the housing 46 of the motor unit 26 includes the track 42, the arrangement of the track 42 and the slider 72A can be reversed. In other words, the housing 46 of the motor unit 26 can be provided with a slider and the first mounting unit 16A can be provided with a slider track. In any case, the attachment portion 40 of the fixed member 20 includes one of a track and a slider that slidably engages the other of the track and the slider, which is formed on the first mounting unit 16A.

The track 42 and the slider 72A are arranged to provide relative movement between the fixed member 20 and the first mounting unit 16A toward at least one of a first direction D1 and a second direction D2, which is opposite to the first direction D1, before the first mounting unit 16A is attached to the fixed member 20 with the fixing fastener 38. Moreover, the track 42 and the slider 72A are further arranged to prevent relative movement between the fixed member 20 and the first mounting unit 16A toward third and fourth directions D3 and D4 that are perpendicular to the first and second directions D1 and D2 while the track 42 and the slider 72A are engaged with each other. The track 42 and the slider 72A forms a movement preventing structure that prevents relative movement between the fixed member 20 and the first mounting unit 16A in the third and fourth directions D3 and D4.

Now the second mounting unit 16B will be discussed in more detail with reference to FIGS. 8 to 14. The second mounting unit 16B is configured as a low clamp type mounting unit that is releasably attached to the front derailleur unit 14 by the fixing fastener 38. The second mounting unit 16B includes a second clamp member 50B that is disposed below the fixed member 20 with the front derailleur 12 in the installed position. Here, the second clamp member 50B is a hinge type band clamp having a pair of clamping portions 52B and 54B. A hinge pin 56B hingedly connects first ends of the clamping portions 52B and 54B together, while second ends of the clamping portions are fastened together by a fastener 58B. Here, the fastener 58B includes a bolt and a nut that are used to draw the second ends of the clamping portions 52B and 54B together for clamping onto seat tube 60 of the bicycle frame 10. The second mounting unit 16B further includes a fixing portion 64B having a threaded hole 66B for receiving the fixing fastener 38. It will be apparent from this disclosure that the fixing portion 64B can be provided with a plurality of threaded holes to selectively receive the fixing fastener 38 if needed and/or desired.

The second mounting unit 16B further includes an attachment portion 70B. In the illustrated embodiment, the fixing portion 64B and the attachment portion 70B are integrally formed together with the clamping portion 52B as a one-piece, unitary member. Here, the attachment portion 70B includes a slider 72B that slidably engages the track 42. Typically, as illustrated herein, the track 42 and the slider 72B are arranged in a generally upright or primarily vertical direction while installed on the bicycle frame 10. While the second mounting unit 16B includes the slider 72B and the housing 46 of the motor unit 26 includes the track 42, the arrangement of the track 42 and the slider 72B can be reversed. In other words, the housing 46 of the motor unit 26 can be provided with a slider and the second mounting unit 16B can be provided with a track. In any case, the attachment portion 40 of the fixed member 20 includes one of a track and a slider that slidably engages the other of the track and the slider, which is formed on the second mounting unit 16B.

The track 42 and the slider 72B are arranged to provide relative movement between the fixed member 20 and the second mounting unit 16B toward at least one of a first direction D1 and a second direction D2, which is opposite to the first direction D1, before the second mounting unit 16B is attached to the fixed member 20 with the fixing fastener 38. Moreover, the track 42 and the slider 72B are further arranged to prevent relative movement between the fixed member 20 and the second mounting unit 16B toward third and fourth directions D3 and D4 that are perpendicular to the first and second directions D1 and D2 while the track 42 and the slider 72B of the second mounting unit 16B are engaged with each other. The track 42 and the slider 72B forms a movement preventing structure that prevents relative movement between the fixed member 20 and the fourth mounting unit 16B in the third and fourth directions D3 and D4.

Figure 15:
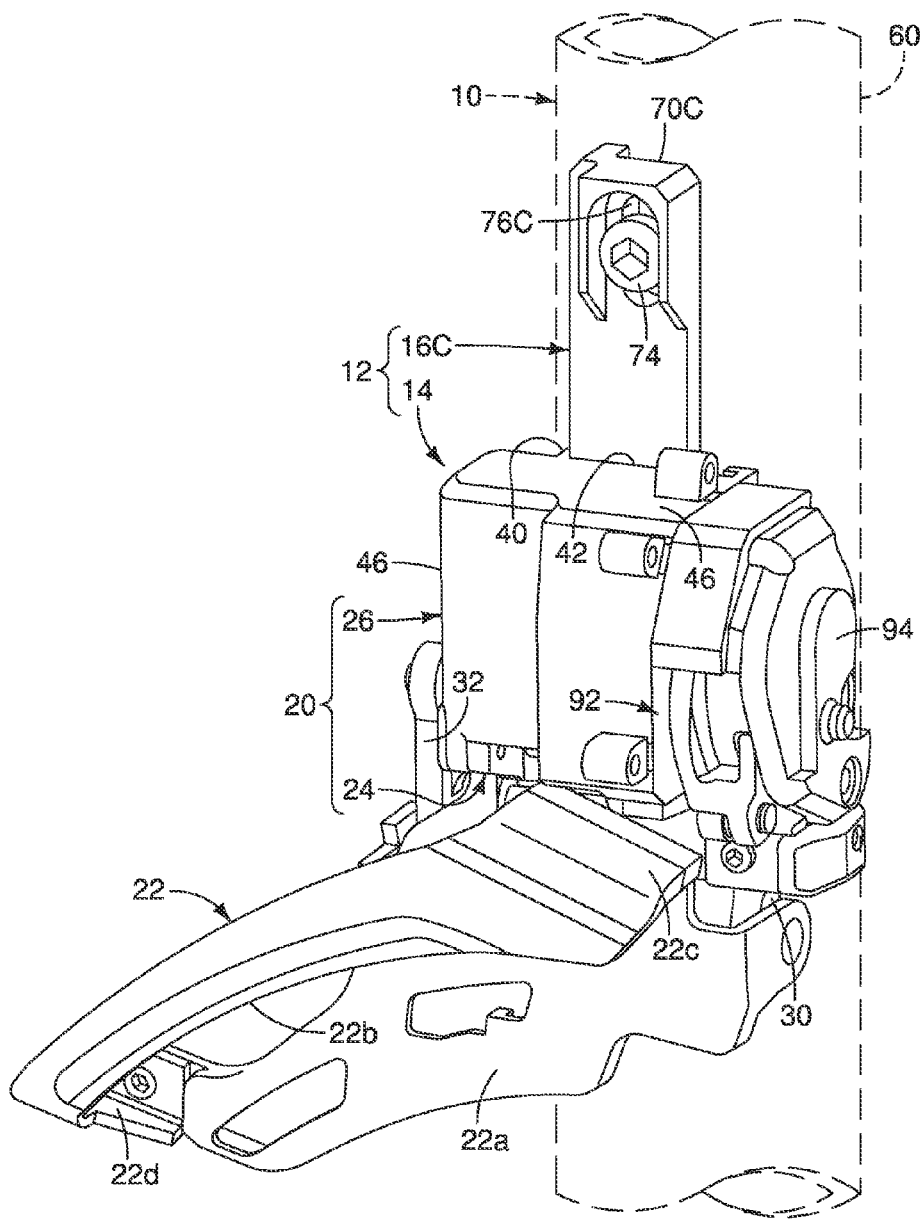
FIG. 15 is a partial side perspective view of the bicycle frame and the front derailleur unit mounted to the frame by a third mounting unit.
Figure 16:
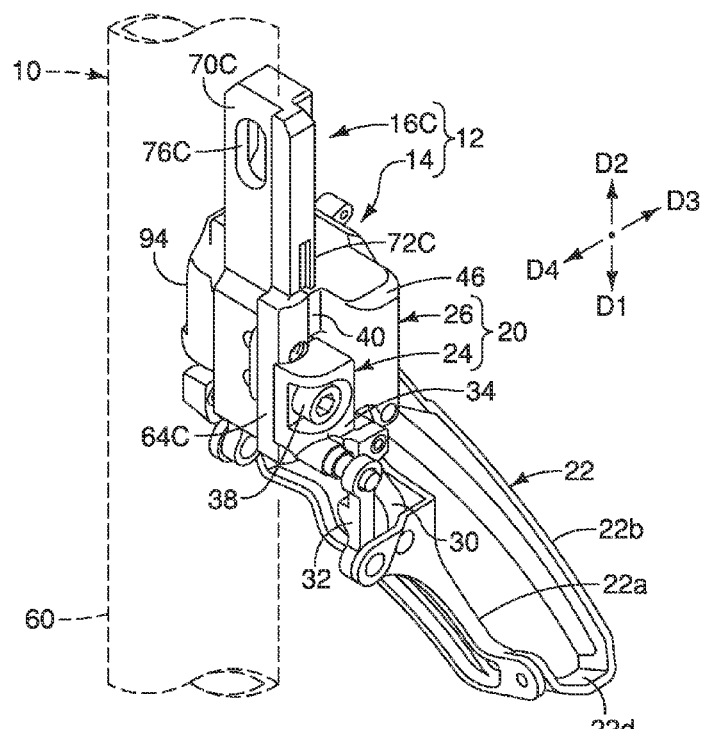
FIG. 16 is a perspective view of the bicycle frame and the front derailleur with the third mounting unit illustrated in FIG. 15 as viewed from the opposite side.
Figure 17:
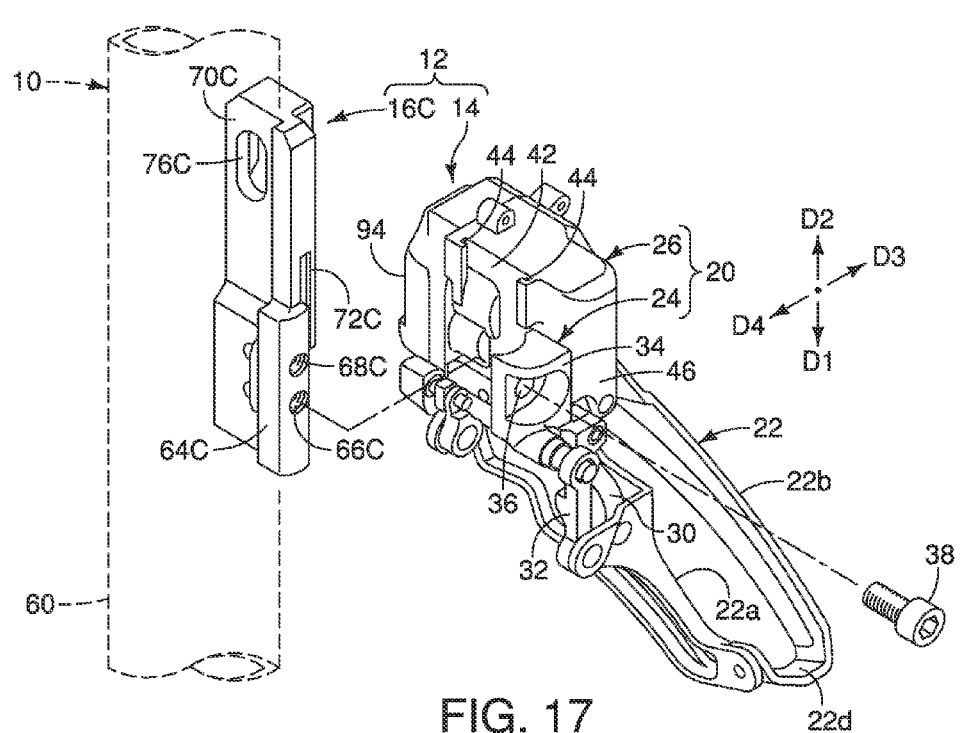
FIG. 17 is a perspective view of the bicycle frame and the front derailleur illustrated in FIGS. 15 and 16 with the front derailleur unit detached from the third mounting unit.
Figure 18:
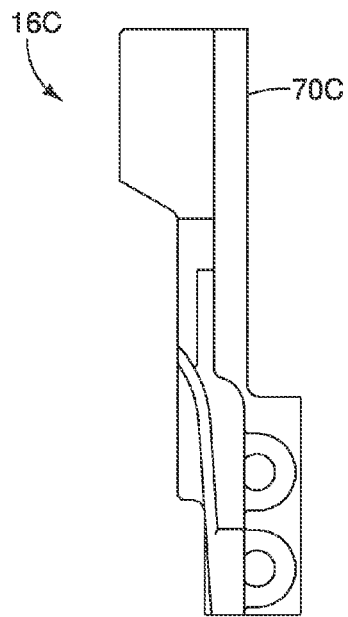
FIG. 18 is a front elevational view of the third mounting unit of the front derailleur illustrated in FIGS. 15 to 17.
Figure 19:
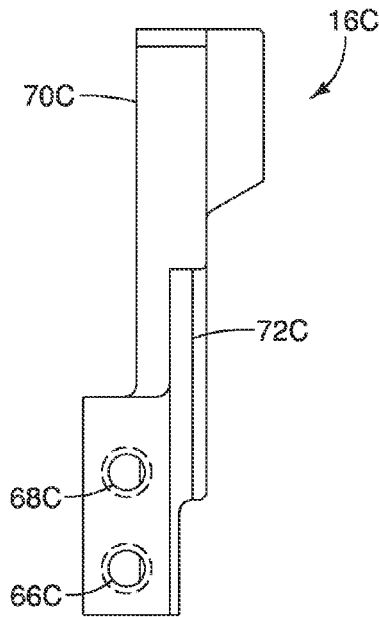
FIG. 19 is a rear elevational view of the third mounting unit of the front derailleur illustrated in FIGS. 15 to 17.
Figure 20:
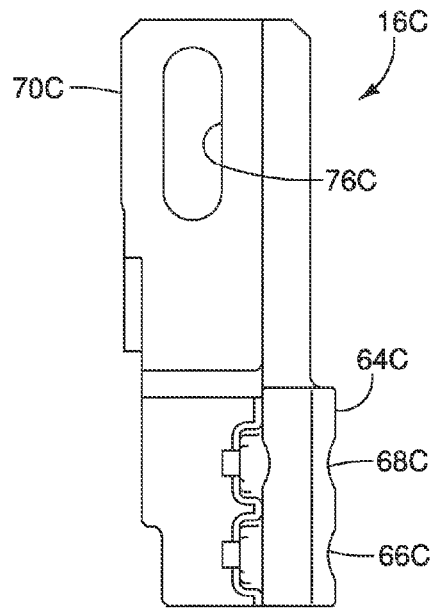
FIG. 20 is a first side elevational view of the third mounting unit of the front derailleur illustrated in FIGS. 15 to 17.
Figure 21:
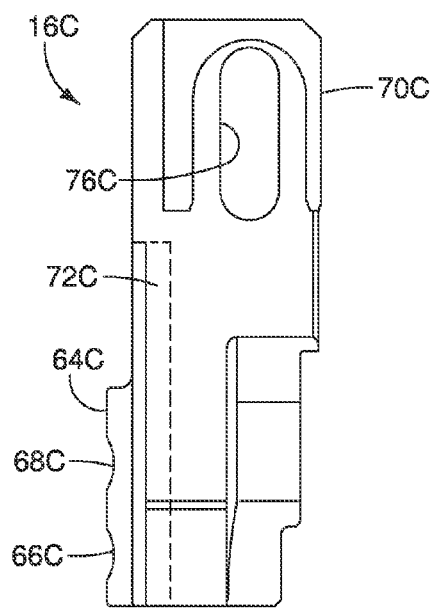
FIG. 21 is a second side elevational view of the third mounting unit of the front derailleur illustrated in FIGS. 15 to 17 as viewed from the opposite side from FIG. 20.

Now the third mounting unit 16C will be discussed in more detail with reference to FIGS. 15 to 21. The third mounting unit 16C is configured as a direct-mount type that is directly attaches to the seat tube 60. The front derailleur unit 14 is releasably attached to the third mounting unit 16C by the fixing fastener 38. Preferably, as seen in FIG. 15, the third mounting unit 16C is a one-piece bracket that is fixed directly onto the seat tube 60 of the bicycle frame 10 by a threaded frame fastener 74 (e.g., a bolt that is threaded into a hole of the seat tube 60. In particular, the third mounting unit 16C includes a frame fastener receiving hole 76C that receives the frame fastener 74 to selectively fix the third mounting unit 16C to the bicycle frame 10. The frame fastener receiving hole 76C is preferably an elongated hole so that the third mounting unit 16C is adjustable fixed to the bicycle frame 10.

The third mounting unit 16C further includes a fixing portion 64C having a pair of threaded holes 66C and 68C for selectively receiving the fixing fastener 38. In the illustrated embodiment, the threaded holes 66C and 68C provide for vertical adjustment of the front derailleur unit 14 relative to the third mounting unit 16C. Of course, one of the threaded holes 66C and 68C can be eliminated if desired.

The third mounting unit 16C further includes an attachment portion 70C. In the illustrated embodiment, the fixing portion 64C and the attachment portion 70C are integrally formed each other as a one-piece, unitary member. Here, the attachment portion 70C includes a slider 72C that slidably engages the track 42. Typically, as illustrated herein, the track 42 and the slider 72C are arranged in a generally upright or primarily vertical direction while installed on the bicycle frame 10. While the third mounting unit 16C includes the slider 72C and the housing 46 of the motor unit 26 includes the track 42, the arrangement of the track 42 and the slider 72C can be reversed. In other words, the housing 46 of the motor unit 26 can be provided with a slider and the third mounting unit 16C can be provided with a track. In any case, the attachment portion 40 of the fixed member 20 includes one of a track and a slider that slidably engages the other of the track and the slider, which is formed on the third mounting unit 16C.

The track 42 and the slider 72C are arranged to provide relative movement between the fixed member 20 and the third mounting unit 16C toward at least one of a first direction D1 and a second direction D2, which is opposite to the first direction D1, before the third mounting unit 16C is attached to the fixed member 20 with the fixing fastener 38. Moreover, the track 42 and the slider 72C are further arranged to prevent relative movement between the fixed member 20 and the third mounting unit 16C toward third and fourth directions D3 and D4 that are perpendicular to the first and second directions D1 and D2 while the track 42 and the slider 72C of the third mounting unit 16C are engaged with each other. The track 42 and the slider 72C forms a movement preventing structure that prevents relative movement between the fixed member 20 and the fourth mounting unit 16C in the third and fourth directions D3 and D4.

Now the fourth mounting unit 16D will be discussed in more detail with reference to FIGS. 22 to 28. The fourth mounting unit 16D is configured as a bottom bracket mount type that is attached to a bottom bracket or a hanger tube 78 of the bicycle frame 10 by a bottom bracket bearing assembly (not shown) or fastener (not shown). Here, the fourth mounting unit 16D is configured as a two-piece member. In particular, the fourth mounting unit 16D includes a first member 80 that has an opening 80a and is configured to be fixed to the bottom bracket 78 of the bicycle frame 10. The fourth mounting unit 16D further includes a second member 82 that mounts the front derailleur unit 14 to the first member 80. Preferably, the second member 82 is adjustably attached to the first member 80. For example, the second member 82 has two slots 82a for receiving screws 84 that are screwed into threaded holes 80b of the first member 80. The fourth mounting unit 16D further includes a fixing portion 64D having threaded holes 66D and 68D for selectively receiving the fixing fastener 38. In the illustrated embodiment, the threaded holes 66D and 68D provide for vertical adjustment of the front derailleur unit 14 relative to the third mounting unit 16D. Of course, one of the threaded holes 66D and 68D can be eliminated if desired.

The fourth mounting unit 16D further includes an attachment portion 70D. In the illustrated embodiment, the fixing portion 64D and the attachment portion 70D are integrally formed each other as a one-piece, unitary member. Here, the attachment portion 70D includes a slider 72D that slidably engages the track 42. Typically, as illustrated herein, the track 42 and the slider 72D are arranged in a generally upright or primarily vertical direction while installed on the bicycle frame 10. While the fourth mounting unit 16D includes the slider 72D and the housing 46 of the motor unit 26 includes the track 42, the arrangement of the track 42 and the slider 72D can be reversed. In other words, the housing 46 of the motor unit 26 can be provided with a slider and the fourth mounting unit 16D can be provided with a track. In any case, the attachment portion 40 of the fixed member 20 includes one of a track and a slider that slidably engages the other of the track and the slider, which is formed on the fourth mounting unit 16D.

The track 42 and the slider 72D are arranged to provide relative movement between the fixed member 20 and the fourth mounting unit 16D toward at least one of a first direction D1 and a second direction D2, which is opposite to the first direction D1, before the fourth mounting unit 16D is attached to the fixed member 20 with the fixing fastener 38. Moreover, the track 42 and the slider 72D are further arranged to prevent relative movement between the fixed member 20 and the fourth mounting unit 16D toward third and fourth directions D3 and D4 that are perpendicular to the first and second directions D1 and D2 while the track 42 and the slider 72D of the fourth mounting unit 16D are engaged with each other. The track 42 and the slider 72D forms a movement preventing structure that prevents relative movement between the fixed member 20 and the fourth mounting unit 16D in the third and fourth directions D3 and D4.

Figure 30:
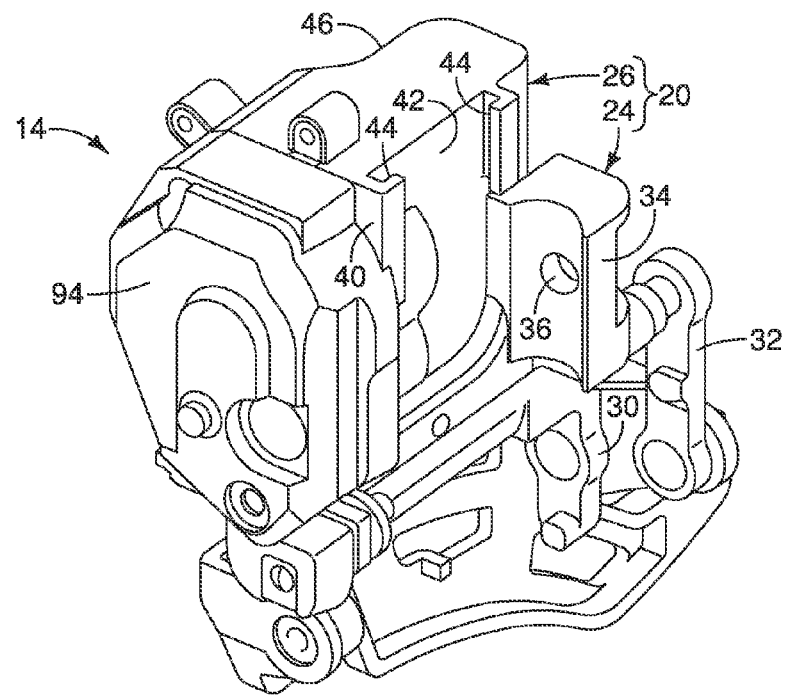
FIG. 30 is a front perspective view of the front derailleur unit illustrated in FIGS. 1 to 28.
Figure 31:
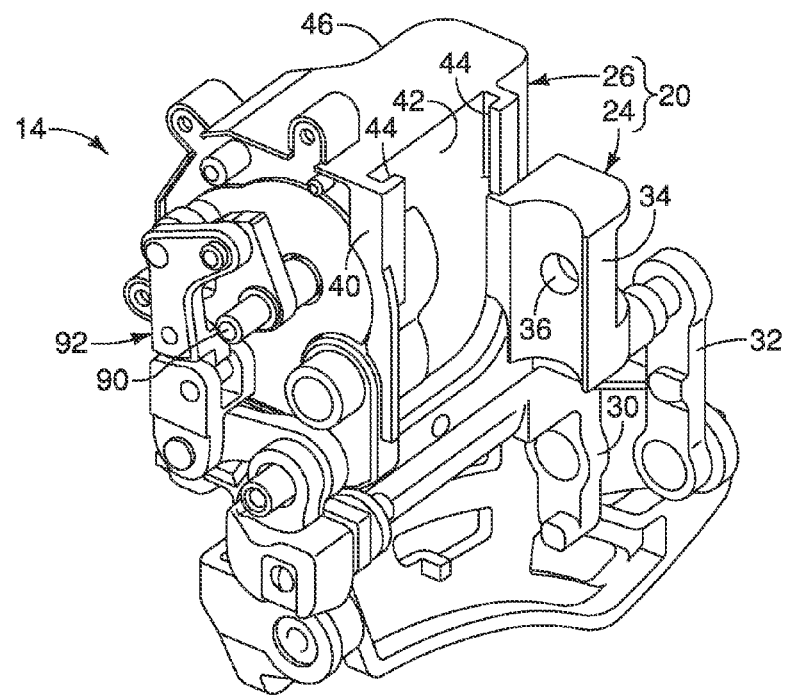
FIG. 31 is a front perspective view of the front derailleur unit illustrated in FIG. 30, but with the drive linkage cover removed.
Figure 32:
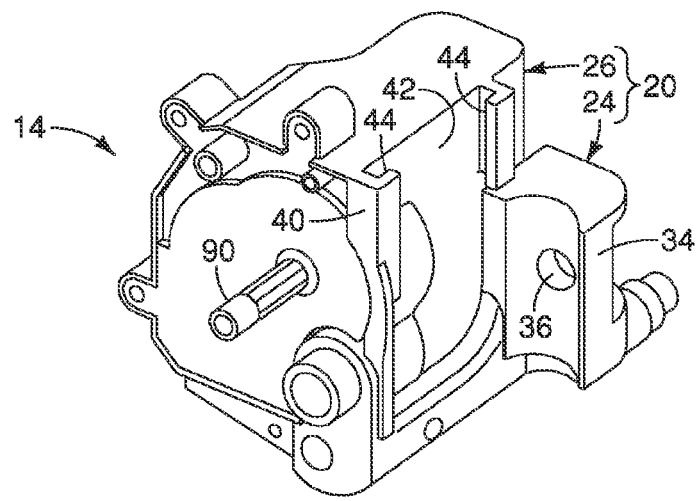
FIG. 32 is a front perspective view of the base member and the motor unit of the fixed member for the front derailleur unit illustrated in FIGS. 30 and 31.
Figure 33:
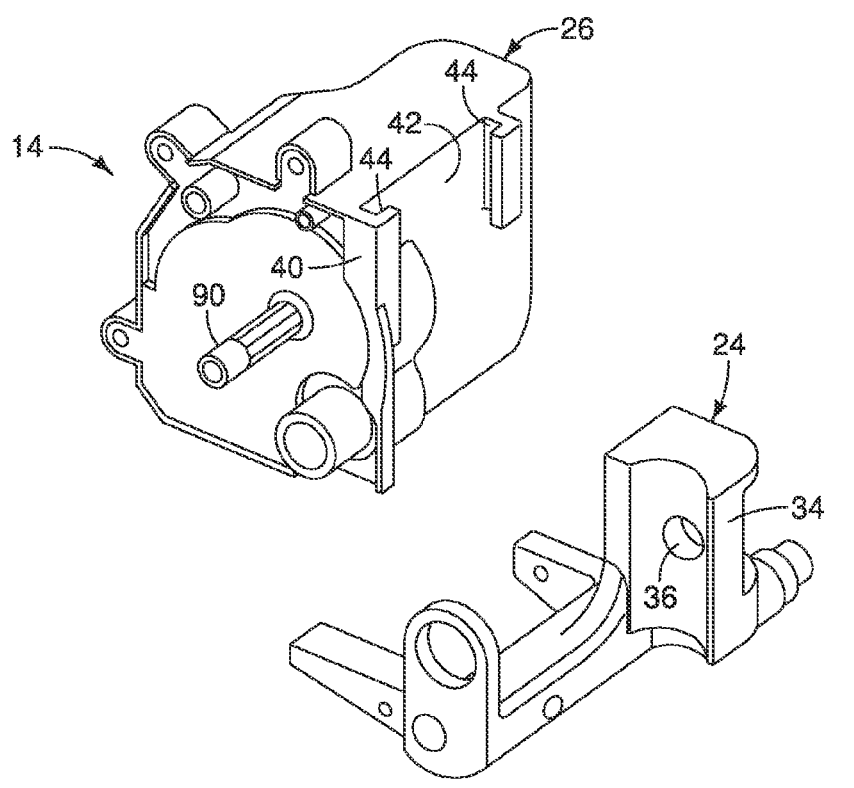
FIG. 33 is an exploded, front perspective view of the base member and the motor unit of the fixed member for the front derailleur unit illustrated in FIGS. 30 to 32.
Figure 34:
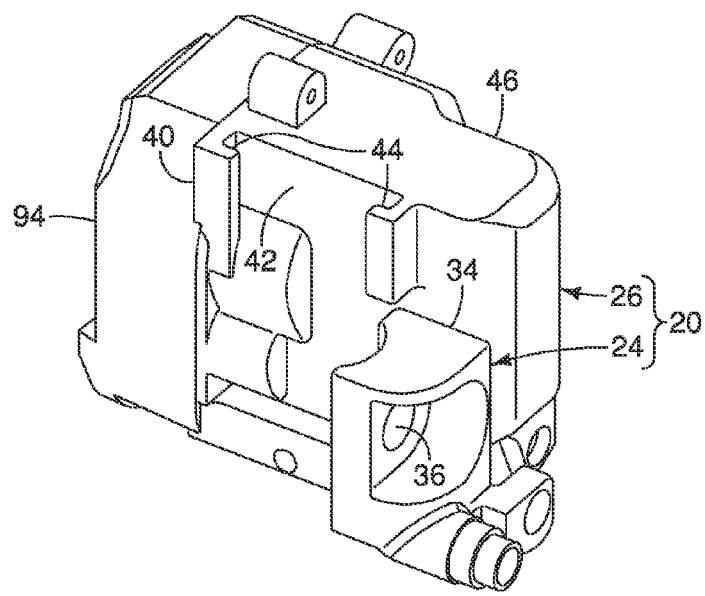
FIG. 34 is a rear perspective view of the electric motor unit of the base member and the motor unit of the fixed member for the front derailleur unit illustrated in FIGS. 30 to 33.
Figure 35:
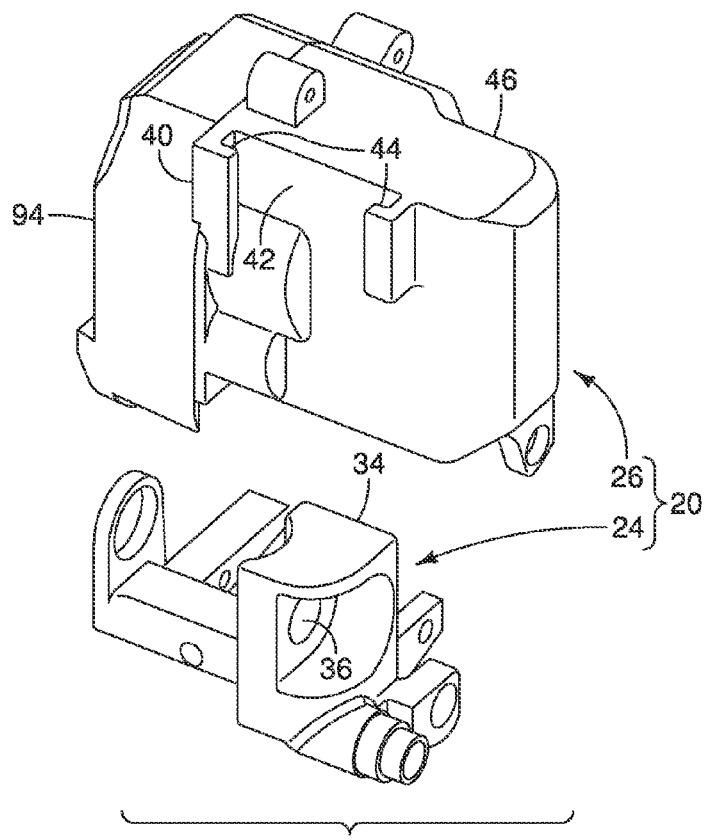
FIG. 35 is an exploded, rear perspective view of the electric motor unit of the base member and the motor unit of the fixed member for the front derailleur unit illustrated in FIGS. 30 to 34.

Referring now to FIGS. 30 to 35, the front derailleur unit 14 will now be further discussed. As mentioned above, the front derailleur unit 14 basically includes the fixed member 20 and the movable member 22, with the fixed member 20 including the base member 24 and the motor unit 26. Basically, the motor unit 26 has an output shaft 90 that is operatively coupled to the movable member 22 by a drive linkage 92 (FIG. 31) to move the movable member 22 with respect to the base member 24. In other words, the motor unit 26 is configured to move the movable member 22 with respect to the base member 24 based on the operation of the motor unit 26, which includes a reversible electric motor. In particular, rotation of the output shaft 90 of the motor unit 26 drives the drive linkage 92 to move the movable member 22 relative to the base member 24. In performing a chain shifting operation, the motor of the motor unit 26 is operated by a user operating device (not shown) to turn the output shaft 90 (i.e., the input member of the connecting structure 24) of the motor unit 26. Depending on the rotational direction of the output shaft 90, the drive linkage 92 will either move the movable member 22 towards or away from the seat tube 60 of the bicycle frame 10. Preferably, as seen in FIG. 30, the drive linkage 92 is mostly concealed by a cover 94, which is removed in FIGS. 31 to 33.

The motor of the motor unit 26 is connected to a battery (not shown) and/or a generator (not shown) via an electrical cord (not shown). Alternatively, the motor unit 26 can be provided with a rechargeable battery (not shown). Preferably, a gear reduction unit (not shown) is provided between the motor and the output shaft 90. Since gear reduction units are commonly used in electric derailleurs, the gear reduction unit of the motor unit 26 will not be discussed and/or illustrated herein. While the derailleur 12 is illustrated as an electric front derailleur, the connecting structure 24 can be operated by a cable with minor modifications. In other words, the motor unit 26 can be replaced with a cable operated arrangement.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. Also it will be understood that although the terms first and second may be used herein to describe various components these components should not be limited by these terms. These terms are only used to distinguish one component from another. Thus, for example, a first component discussed above could be termed a second component and vice-a-versa without departing from the teachings of the present invention. The foregoing also applies to words having similar meanings such as the terms, "including", "having" and their derivatives. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired so long as they do not substantially affect their intended function.

Although a four bar linkage is used in the illustrated embodiment, as discussed above, the movable member 22 can be connected to the base member 24 with other coupling arrangements. In other words, the electric front derailleur 12 can be configured to have a coupling arrangement which is constructed with a single link member, or which is constructed with more than two link members. Thus, the present invention can be used with electric front derailleurs that use other types of coupling arrangements.

Also components that are shown directly connected or contacting each other can have intermediate structures disposed between them, unless specifically stated otherwise. The functions of one element can be performed by two, and vice versa, unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A front derailleur unit comprising:
a fixed member having an attachment portion that is configured to be selectively and releasably attached to any one of a plurality of different type mounting units, each of the different type mounting units being configured to be detachably attached to a bicycle frame and including one of a track and a slider, the attachment portion including the other of the track and the slider, the track including a pair of parallel grooves and the slider including a pair of projections configured to slidably engage with the parallel grooves, the track and the slider forming a movement preventing structure that prevents relative movement between the fixed member and the one of the plurality of different type mounting units in at least one direction while the projections are slidably engaged with the parallel moves; and
a movable member movably supported to the fixed member to move with respect to the fixed member.

2. The front derailleur unit according to claim 1, wherein the track and the slider are configured and arranged to provide relative movement between the fixed member and the one of the plurality of different type mounting units toward at least one of a first direction and a second direction, which is opposite to the first direction, and the track and the slider are further configured and arranged to prevent relative movement between the fixed member and the different type mounting units toward third and fourth directions that are perpendicular to the first and second directions while the track and the slider are slidably engaged with each other.

3. The front derailleur unit according to claim 2, wherein the track and the slider are configured and arranged to prevent relative movement between the fixed member and the different type mounting units toward the second, third and fourth directions while the track and the slider are slidably engaged with each other.

4. The front derailleur nit according to claim 1, wherein the attachment portion includes the track.

5. The front derailleur unit according to claim 1, wherein the fixed member includes a base member and a motor unit, and
the attachment portion is arranged at one of the base member and the motor unit.

6. The front derailleur unit according to claim 5, wherein the fixed member further includes a fixing portion having at least one fixing fastener receiving hole that receives a fixing fastener to selectively fix the fixed member to the one of the different type mounting units.

7. The front derailleur unit according to claim 6, wherein the fixing portion is arranged at the one of the base member and the motor unit which does not include the attachment portion.

8. The front derailleur unit according to claim 7, wherein the attachment portion is arranged at the motor unit, and the fixing portion is arranged at the base member.

9. The front derailleur unit according to claim 1, wherein the fixed member includes a fixing portion having at least one fixing fastener receiving hole that receives a fixing fastener to selectively fix the fixed member to the one of the different type mounting units.

10. The front derailleur unit according to claim 1, wherein the other of the track and the slider included the attachment portion is disposed entirely on a bicycle frame facing side of the fixed member.

11. The front derailleur unit according to claim 10, wherein the other of the track and the slider included on the attachment portion does not extend beyond a frontward edge or a rearward edge of the fixed member in a longitudinal direction of the bicycle frame with the front derailleur unit installed on the bicycle frame.

12. A front derailleur set comprising:
a front derailleur unit including a fixed member having an attachment portion, and a movable member movably supported to the fixed member to move with respect to the fixed member; and
a first mounting unit configured to be detachably attached to a bicycle frame, the first mounting unit including a first one of a track and a slider,
the attachment portion including the other of the track and the slider, the track including a pair of parallel grooves and the slider including a pair of projections configured to slidably engage with the grooves, the track and the slider forming a movement preventing structure that prevents relative movement between the fixed member and the first mounting unit in at least one direction while the projections are slidably engaged with the parallel grooves.

13. The front derailleur set according to claim 12, wherein the track and the slider are configured and arranged to provide relative movement between the fixed member and the first mounting unit toward at least one of a first direction and a second direction, which is opposite to the first direction, and
the track and the slider are further configured and arranged to prevent relative movement between the fixed member and the different type mounting units toward third and fourth directions that are perpendicular to the first and second directions while the track and the slider are slidably engaged with each other.

14. The front derailleur set according to claim 13, wherein the track and the slider are arranged to prevent relative movement between the fixed member and the different type mounting units toward the second, third and fourth directions while the track and the slider are slidably engaged with each other.

15. The front derailleur set according to claim 12, wherein the attachment portion includes the track.

16. The front derailleur set according to claim 12, wherein the fixed member includes a base member and a motor unit, and the attachment portion is arranged at one of the base member and the motor unit.

17. The front derailleur set according to claim 16, wherein the fixed member further includes a fixing portion having at least one fixing fastener receiving hole that receives a fixing fastener to selectively fix the fixed member to the first mounting unit.

18. The front derailleur set according to claim 17, wherein the fixing portion is arranged at the one of the base member and the motor unit which does not include the attachment portion.

19. The front derailleur set according to claim 18, wherein the attachment portion is arranged at the motor unit, the fixing portion is arranged at the base member.

20. The front derailleur set according to claim 12, wherein the fixed member includes a fixing portion having at least one fixing fastener receiving hole that receives a fixing fastener to selectively fix the fixed member to the first mounting unit.

21. The front derailleur set according to claim 12, further comprising
a second mounting unit having a second clamp member disposed below the fixed member with the front derailleur unit and the second mounting unit installed on a bicycle second mounting unit including one of a track and a slider configured to slidably engage with the attachment portion.

22. The front derailleur set according to claim 12, further comprising
a third mounting unit having a frame fastener receiving hole that receives a frame fastener to selectively fix the third mounting unit to the bicycle frame, the third mounting unit including one of a track and a slider configured to slidably engage with the attachment portion.

23. The front derailleur set according to claim 22, wherein the frame fastener receiving hole is an elongated hole so that the third mounting unit is adjustably fixed to the bicycle frame.

24. The front derailleur set according to claim 12, further comprising
a fourth mounting unit having a first member configured to be fixed to a bottom bracket of the bicycle frame, the fourth mounting unit including one of a track and a slider configured to slidably engage with the attachment portion.

25. The front derailleur set according to claim 24, wherein the fourth mounting unit has a second member adjustably attached to the first member, the second member including the one of the track and the slider.

26. The front derailleur unit according to claim 12, wherein the first mounting unit has a first clamp member disposed above the movable member with the front derailleur unit and the first mounting unit installed on the bicycle frame.

27. A mounting unit for mounting a front derailleur unit to a bicycle frame, the mounting unit comprising:
one of a track and a slider configured to slidably engage the other of the track and the slider provided on a fixed member of the front derailleur unit, the track including a pair of parallel grooves and the slider including a pair of projections configured to slidably engage with the grooves, the track and the slider forming a movement preventing structure that prevents relative movement between the fixed member and the mounting unit in at least one direction while the projections are slidably engaged with the parallel grooves.

28. The mounting unit according to claim 27, wherein the mounting unit includes the slider.

* * * * *